United States Patent Office 3,395,217
Patented July 30, 1968

3,395,217
PROCESS FOR THE CONTROL OF
OSSEOUS HEMORRHAGE
Wayne H. Statt, Midland, Mich., assignor to The Dow Chemical Company, Midland, Mich., a corporation of Delaware
No Drawing. Filed June 19, 1964, Ser. No. 376,559
2 Claims. (Cl. 424—81)

ABSTRACT OF THE DISCLOSURE

A surgical bone wax for the control of hemorrhage comprising a low molecular weight ethylene copolymer wax containing about 15 to about 40 percent by weight of another unsaturated constituent (e.g. ethylene-propylene copolymer) and having a molecular weight in the range of 1000 to 4000.

The present invention relates to a process for the control of osseous hemorrhage and to a synthetic wax therefor.

Various substances and compositions have been employed by members of the medical profession to control the bleeding from cut bone surfaces. One class of materials used for the control of this type of hemorrhage is called bone wax. Bone waxes are used for the purpose of controlling hemorrhages from the cut surfaces of bones, such as those of the skull, by forcibly smearing the wax over the cut surface so that the material acts mechanically to occlude and seal the open ends of the bleeding osseous vessels and sinuses.

Bone waves used in surgery today are generally prepared from refined beeswax which has been admixed with other non-absorbable and water insoluble hydrocarbons and vegetable oils. Certain disadvantages inhere in these bone wax compositions, as for example, relatively poor adhesion properties, separation of wax components and the hard brittle state of the wax at room temperatures requiring use at elevated temperatures.

In accordance with the present invention it has been found that low molecular weight ethylene copolymer waxes containing from about 15 to about 40 percent by weight of another unsaturated constituent and having molecular weights in the range of 1000 to 4000 are extremely effective in controlling osseous hemorrhage.

The ethylene copolymer bone waxes of the present invention have a semi-solid consistency such that they can be kneaded between the fingers when at room temperature and have just the right amount of tack and adhesion so that they can be easily manipulated in the hands of the surgeon or applied by any suitable applicator such as a gloved finger, spatula or appropriate disposable applicator, spread on the bone and adhered to the bone surface. Excess wax may easily be removed or replaced leaving the field clear and uncluttered. In addition, since the wax adheres to itself, the wax application if necessary may be patched in the presence of blood. Being a single chemical entity the wax remains uniform with no separation of the bone wax constituents with time or heat as occurs with prior art bone waves. The ethylene copolymer waxes are readily sterilizable by ordinary autoclaving procedures as for example at temperatures in the range of 115° C.

The ethylene copolymers of the present invention are copolymers of ethylene and another unsaturated monomer constituent such as propylene, butene-1, pentene-1, methyl acrylate, methyl methacrylate, ethyl acrylate, ethyl methacrylate and the like, the other unsaturated monomer constituent being present in the copolymer in the range of about 15 to about 40 percent by weight.

The copolymers are prepared by interpolymerizing ethylene and another unsaturated monomer constituent at a high pressure, e.g. 15,000 to 30,000 p.s.i. or higher, at a reaction temperature between 300 and 500° F. for a period of from 30 sec. to 5 minutes in the presence of from 0.001 to 3% of a catalyst such as oxygen, or oxygen-yielding peroxy compound, as for example benzoyl peroxide or lauroyl peroxide.

In order to more fully illustrate the invention, but without being restricted thereto, the following examples are given.

EXAMPLE 1

A low molecular weight ethylene-propylene copolymer wax containing about 25 weight percent propylene and having the following properties

| | |
|---|---|
| Average molecular weight (approx.) | 3,000 |
| Absolute viscosity (Oswald Viscometer) at 140° C., cps. | 224 |
| Melt index (ASTM D1238–62T) at 80° C. with 0.020 inch orifice decigrams per minute | 10–20 | was sterilized at a temperature of 115° C. and applied by means of a dampened gloved finger with moderate hand pressure to the cut exposed sternum of a dog. The wax was found to have excellent adhesion to the bone surface and stopped the blood flow without any loss in adhesiveness.

EXAMPLE 2

The ethylene-propylene copolymer wax of Example 1 was used in a hypophysectomy in a dog wherein entry was made through the soft palate and into the sella turcica. The wax was used to control blood flow from the cancellous bone covering the sella, the excess wax being easily removed to open the field for the surgical removal of the pituitary gland.

The ethylene-propylene copolymer wax of Example 1 was also used in cannulation of various cranial vessels to control leakage and to seal the burr drill holes in the skull of dogs.

What is claimed is:

1. A process for the control of bleeding from cut bone surfaces which comprises applying to the exposed bone surface a low molecular weight ethylene copolymer wax having a molecular weight in the range of 1000 to 4000 wherein the other unsaturated monomer is a member of the group consisting of propylene, butene-1, pentene-1, methyl acrylate, methyl methacrylate, ethyl acrylate, and ethyl methacrylate and is present in an amount from about 15 to 40 percent by weight to occlude and seal the ends of the bleeding osseous vessels and sinuses.

2. The process of claim 1 wherein the polyethylene wax is a copolymer of ethylene and propylene containing about 15 to about 40 percent by weight propylene.

References Cited

UNITED STATES PATENTS 2,642,375   6/1953   Henderson _____ 167—65.5

OTHER REFERENCES

Warth, The Chemistry and Technology of Waxes, Chapman and Hall Ltd., London, 2nd ed., 1956, pp. 443–450.

ALBERT T. MEYERS, Primary Examiner.

A. P. FAGELSON, Assistant Examiner.